(12) United States Patent
Pavlick

(10) Patent No.: US 8,004,974 B2
(45) Date of Patent: Aug. 23, 2011

(54) VIRTUALIZED COMPUTING ARCHITECTURE HAVING MULTIPLE REALMS

(75) Inventor: Timothy Pavlick, Bethesda, MD (US)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 11/382,334

(22) Filed: May 9, 2006

(65) Prior Publication Data
US 2007/0263534 A1 Nov. 15, 2007

(51) Int. Cl.
H04L 12/26 (2006.01)
(52) U.S. Cl. ........................................................ 370/230
(58) Field of Classification Search .................. 370/230, 370/235, 412
See application file for complete search history.

(56) References Cited

U.S. PATENT DOCUMENTS

| | | | |
|---|---|---|---|
| 6,597,684 B1 * | 7/2003 | Gulati et al. | 370/351 |
| 6,598,034 B1 * | 7/2003 | Kloth | 706/47 |
| 6,772,178 B2 | 8/2004 | Mandal et al. | |
| 6,859,931 B1 | 2/2005 | Cheyer et al. | |
| 6,868,441 B2 | 3/2005 | Greene et al. | |
| 7,263,065 B1 * | 8/2007 | Cahn | 370/235 |
| 7,266,085 B2 * | 9/2007 | Stine | 370/252 |
| 7,457,299 B2 * | 11/2008 | Fette et al. | 370/401 |
| 2003/0202468 A1 | 10/2003 | Cain et al. | |
| 2004/0028212 A1 | 2/2004 | Lok et al. | |
| 2004/0264403 A1 | 12/2004 | Fette et al. | |
| 2005/0033588 A1 | 2/2005 | Ruiz et al. | |
| 2005/0131933 A1 | 6/2005 | Jha | |
| 2005/0157661 A1 | 7/2005 | Cho | |
| 2006/0149788 A1 * | 7/2006 | Bosloy et al. | 707/201 |
| 2006/0203808 A1 * | 9/2006 | Zhang et al. | 370/352 |
| 2007/0011126 A1 * | 1/2007 | Conner et al. | 706/47 |

OTHER PUBLICATIONS

Hagel, J. et al., "Special Guide to Business Orchestration, From Tightly Bound to Loosely Coupled," Software Development, Sep. 2003, www.sdmagazine.com/documents/s=8860/sdm0309b/sdm0309b.html?temp=F6KnZFYIxW, pp. 1-9, printed on May 1, 2006.

Author Unknown, "Sonic ESB," Sonic Software Products, http://www.sonicsoftware.com/products/sonic_esb/index.ssp, pp. 1-2, printed on May 1, 2006.

Guerra, A., "Integrating Disparate Databases," Wall Street & Technology, Apr. 27, 2004, http://www.wallstreetandtech.com/showArticle.ihtml?articleID=19201913, pp. 1-3, printed on May 1, 2006.

Reider, R. et al., "Logical Communications Support: Interface and Subsystem," IBM Technical Disclosure Bulletin No. 12, May 1992, pp. 232-234.

* cited by examiner

*Primary Examiner* — Derrick W Ferris
*Assistant Examiner* — Mohammad Anwar
(74) *Attorney, Agent, or Firm* — Douglas A. Lashmit; Hoffman Warnick LLC

(57) ABSTRACT

An architecture and method for implementing a nodal complex (NC) supporting multiple quality of service (QoS) realms is provided. The disclosed architecture includes: a first set of extended enterprise service bus (EESB) rules for supporting nodes operating in a sub-second QoS realm; a second set of EESB rules for supporting nodes operating in a millisecond QoS realm; a third set of EESB rules for supporting nodes operating in a microsecond QoS realm; and a fourth set of EESB rules for communicating data and sharing compute capability amongst nodes operating in different QoS realms by using an inter-bus communication pattern that is superordinate to the first, second and third sets of EESB rules.

9 Claims, 2 Drawing Sheets

VIRTUALIZED COMPUTING ARCHITECTURE HAVING MULTIPLE REALMS

FIELD OF THE INVENTION

The invention relates generally to virtualized computing architectures, and more particularly, to a virtualized computing architecture platform that supports multiple realms, associated quality of services and associated rule sets.

BACKGROUND OF THE INVENTION

In a given setting, it is not unusual for computing operations to take place within different time-based computing realms. For example, in an automobile, information about scheduling upcoming servicing would generally be considered low priority and could be adequately processed in a non-real time manner (e.g., sub-seconds); information regarding engine temperature, being somewhat important, could be adequately processed in a near-real time manner (e.g., milliseconds); and information such as airbag deployment, which is critical, should be processed in a real time manner (e.g., microseconds).

Similarly, in a warfare environment, different types of information need to be processed within different timing realms. For instance, troop movement information could be adequately processed in a non-real time manner (e.g., sub-seconds); information regarding airborne threats may be adequately processed in a near-real time manner (e.g., milliseconds); and information related to missile navigation should be processed in a real time manner (e.g., microseconds).

Unfortunately, regardless of the application, different realms are currently architected with different technologies and methods, making later composability difficult and expensive, if not impossible. This presents challenges in environments such as "Net-Centric" architectures proposed by the Department of Defense. In Net-Centric architectures, each node of a system is plugged into the Global Information Grid (GIG) that allows sharing of resources, both data and computation. Implicit in this Net-Centric architecture is the ability to deploy individual computational components that are accessible on the GIG. These computational components offer services that are discoverable, can discover each other and are composable. For the vision of Net-Centric warfare to be achieved, nodes must not only be added to the GIG incrementally, they must add up to a greater capability, i.e., compose or aggregate.

An evolving technology that supports the provisioning of capabilities composed of services realized from stand alone components is Service Oriented Architecture (SOA). SOA requires a standardized way of describing services, the data or computations they provide and/or consume, and the mechanism for linking the providers and consumers. These standards operate across systems and components. Web Services are one example of SOA, which are being widely deployed in the development of new systems as well as in the building of systems from existing parts.

The concept of an Enterprise Service Bus (ESB) is an architectural construct that bridges the gap between different systems, communication protocols, or data formats. ESBs can broker Web Services as well as any other services in a SOA. The essential features of an ESB include: a repository in which the metadata that describes the services, suppliers and consumers resides; the mediations and their operation on the information flowing between supplier and consumer; and the discovery, routing and matching, and event processing that realize the actual dynamic, autonomic nature needed to realize a SOA.

Unfortunately, current implementations of ESBs only allow for the delivery of services in a non-real time realm (i.e., level 3 quality of services (QoS)). However, in many environments, such as a combat-based application, there may be segments that require level 1 (microsecond realm) and level 2 (millisecond realm) QoS. As such, commercial ESB products are not currently suited for combat, and other mixed realm applications. Accordingly, a need exists for a single architecture, such as an ESB type construct, that can support multiple realms, and their associated rule sets.

SUMMARY OF THE INVENTION

The present invention addresses the above-mentioned problems, as well as others, by providing an extended enterprise service bus (EESB) architecture that can support multiple QoS realms within a single complex of nodes or nodal complex (NC). A nodal complex is described herein as a set of nodes that may either be arranged, or arrange themselves, in a multilayered nested fashion, i.e., sets of nodes within a node. A node may be defined as a system or component in a nodal complex, e.g., on the GiG, which contains at least one EESB. In particular, the present invention provides a Net-Centric environment that splits the computing platform into three QoS realms:

L3: sub-second latency & non-deterministic,
L2: millisecond grade latency & deterministic, and
L1: microsecond grade latency & deterministic.

Within the nodal complex, each node includes an EESB that governs its touch point to the other nodes, as well as internal communications within the node itself. A common framework for all EESBs is utilized to simplify the matrix of nodes with the complex.

In a first aspect, the invention provides an architecture for implementing a nodal complex that supports multiple quality of service (QoS) realms, comprising: a first set of extended enterprise service bus (EESB) rules for supporting nodes operating in a sub-second QoS realm; a second set of EESB rules for supporting nodes operating in a millisecond QoS realm; a third set of EESB rules for supporting nodes operating in a microsecond QoS realm; and a fourth set of EESB rules for communicating data and sharing compute capability amongst nodes operating in different QoS realms by using an inter-bus communication pattern that is super-ordinate to the first, second and third sets of EESB rules.

In a second aspect, the invention provides a method for implementing a nodal complex (NC) having an architecture that supports multiple quality of service (QoS) realms, comprising: providing a first set of extended enterprise service bus (EESB) rules for supporting nodes operating in a sub-second QoS realm; providing a second set of EESB rules for supporting nodes operating in a millisecond QoS realm; providing a third set of EESB rules for supporting nodes operating in a microsecond QoS realm; and communicating data and sharing compute capability amongst nodes operating in different QoS realms by using an inter-bus communication pattern that is super-ordinate to the first, second and third sets of EESB rules.

In a third aspect, the invention provides a program product stored on a computer usable medium for allowing a node to participate in a nodal complex that has an architecture that supports multiple quality of service (QoS) realms, wherein the computer program product comprises: program code configured for providing an extended enterprise service bus (EESB) defined from a rule set selected from the group consisting of: a first set of EESB rules for supporting nodes operating in a sub-second QoS realm, a second set of EESB rules for supporting nodes operating in a millisecond QoS realm, and a third set of EESB rules for supporting nodes operating in a microsecond QoS realm; and program code configured for providing a fourth set of rules for communicating data and sharing compute capability amongst nodes operating in different QoS realms by using an inter-bus communication pattern that is super-ordinate to the first, second and third sets of EESB rules.

In a fourth aspect, the invention provides architecture for implementing a nodal complex that supports multiple quality of service (QoS) realms, comprising: a plurality of different extended enterprise service bus (EESB) rule sets for supporting nodes operating in different QoS realms in the nodal complex, wherein each rule set includes a shared bus pattern that allows for interoperability amongst nodes operating in different QoS realms.

In a fifth aspect, the invention provides a method for deploying an application for providing access for a node to a nodal complex having an architecture that supports multiple quality of service (QoS) realms, comprising: providing a computer infrastructure being operable to: associate an extended enterprise service bus (EESB) to the node, wherein the EESB is defined from a rule set selected from the group comprising: a first set of EESB rules for supporting nodes operating in a sub-second QoS realm, a second set of EESB rules for supporting nodes operating in a millisecond QoS realm, and a third set of EESB rules for supporting nodes operating in a microsecond QoS realm; and wherein the EESB allows the node to communicate data and share compute capability with other nodes in the network operating in different QoS realms by using a fourth set of EESB rules that provides an inter-bus communication pattern that is super-ordinate to the first, second and third sets of EESB rules.

In a sixth aspect, the invention provides computer software for accessing nodes in a nodal complex that supports multiple quality of service (QoS) realms, the computer software comprising instructions to cause a computer to perform the following functions: request a service from a node by interfacing with an extended enterprise service bus (EESB) associated with the node, wherein the EESB is defined from a rule set selected from the group comprising: a first set of EESB rules for supporting nodes operating in a sub-second QoS realm, a second set of EESB rules for supporting nodes operating in a millisecond QoS realm, and a third set of EESB rules for supporting nodes operating in a microsecond QoS realm; and wherein the EESB allows the node to communicate data with other nodes in the network operating in different QoS realms by using a inter-bus pattern that is conversant with the first, second and third sets of EESB rules but contains separate rule sets for interacting with each QoS realm, which are unique to the realm-based rule sets of EESB1, EESB2 and EESB3.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
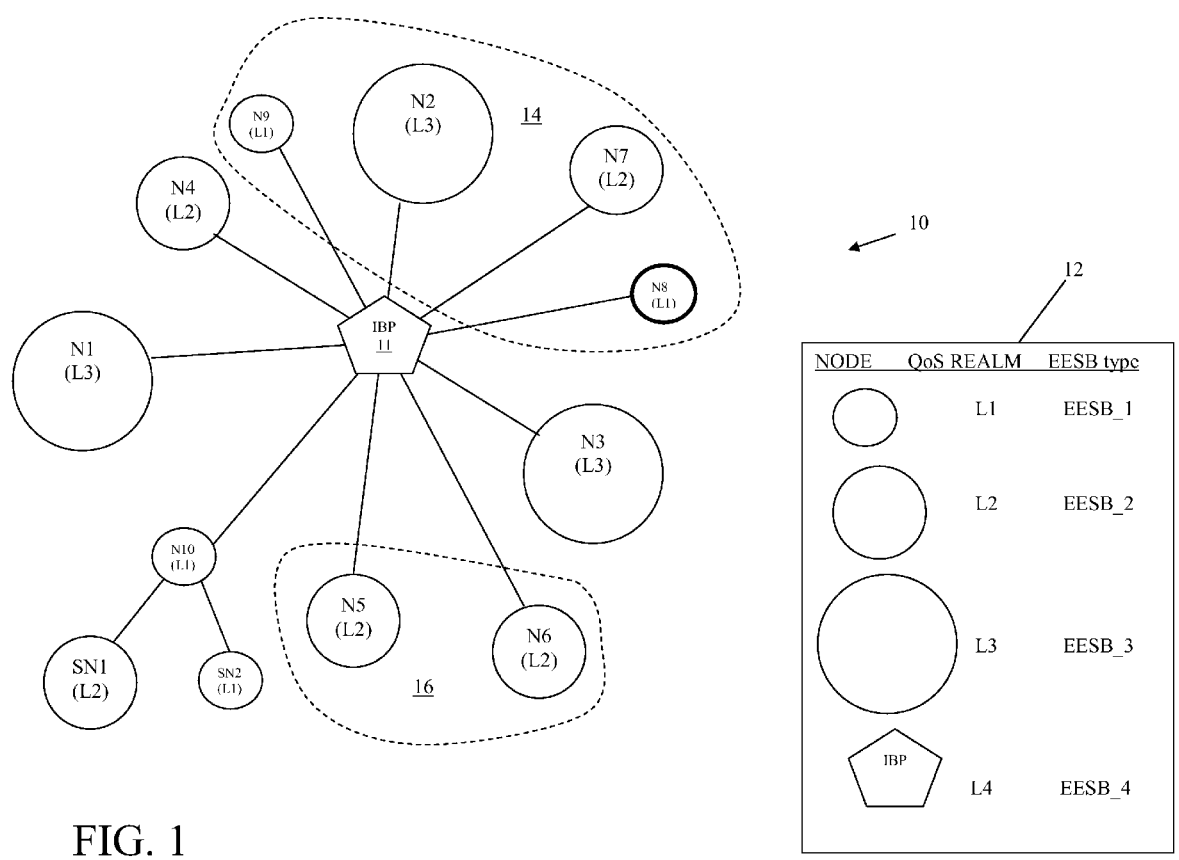
FIG. 1 depicts a nodal complex having an EESB architecture in accordance with an embodiment of the present invention.

Referring now to drawings, FIG. 1 depicts a conceptual view of a nodal complex (NC) 10 that supports computing in three quality of service QoS realms. NC 10 may comprise any type of network structure, including a grid, a GIG, etc. Included in the NC 10 are three different classes of nodes, with each class operating in a particular QoS realm. For the purposes of this illustrative example, the three QoS realms are defined as:

L3: sub-second grade latency & non-deterministic (shown as the large circles);

L2: millisecond grade latency & deterministic (shown as the medium circles); and L1: microsecond grade latency & deterministic (shown as the small circles).

Note that while the invention is described with reference to three QoS realms, the concepts of the invention could be applied to an NC having nodes operating in any number of different QoS realms.

NC 10 includes an extended enterprise service bus (EESB) architecture that provides a common semantic framework that organizes communications and compute capabilities across all of the nodes in NC 10 and allows for enhanced cross nodal interoperability. EESB extends the concepts of traditional ESB architectures, typically found in L3 based environments, such as SOA and Web Services. Each node in NC 10 includes an EESB, which contains middleware that provides rules and technology for inter-nodal communication that allows a node to interact with other nodes in NC 10. As can be seen in this example, nodes N1-N3 operate within NC 10 in the L3 sub-second realm, nodes N4-N7 and subnode SN1 operate within NC 10 in the L2 millisecond realm, and nodes N6-N10 and subnode SN2 operate within NC 10 in the L1 microsecond realm.

For the purposes of this disclosure, a node may be defined as any type of computational or operational structure that contains an extended enterprise service bus (EESB), e.g., a component, sensor, subsystem, system, system of systems, weapons platform, etc. If the structure has an exposure point to NC 10, then it is a node. If the structure communicates with other structures, but not directly to NC 10 then it is a subnode. For instance, SN1 and SN2 are subnodes of N10. Every node, as defined by an exposure point to grid 10, should be NC-ready. A NC-ready node is able to either consume or provide a service/communication, or multiple services/communications, to other nodes connected to the NC 10. If the architecture of a node allows for this behavior, then the node is NC-ready. If a node is actively participating in NC 10 via a service/communications exchange, then the node is referred to as NC-operational.

Features of EESBs include: a mechanism where communication methods can be defined; a mechanism for defining and deploying transformations to information; mediation; a mechanism to route messages between the provider and the consumer once the desired service is discovered; security; information assurance; event handling; exception handling; and many others. The concept of an EESB can encompass a wide range of capabilities. A major server node (e.g., a command center) in NC 10 may need a full compliment of these services, while others (e.g., a personal digital assistant (PDA) in the field) may need a micro-footprint EESB with a very limited range of capability and scalability. Matching service level requirements with a provider's service level capability is another function of an EESB.

Note that any type of NC architecture for discovering nodes and services, exchanging information and supporting information exchange could be utilized. Such a system may for example be capable of supporting SOA, Enterprise Application Integration (EAI), point to point messaging, etc.

Illustrative examples of the enterprise services provided within the NC architecture are detailed below. It is important to note that the pattern of their inclusion is determined by the kind of EESB deployed, e.g., L1-style nodes have the most minimal set of features (but are the most performant), while L3-style nodes have the most robust set of features but operate at the lowest QoS. Illustrative enterprise services include:

Enterprise Systems Management: The set of services that enable the life cycle management of the information environment. They provide end-to-end NC performance monitoring, configuration management and problem detection. An EESB operates along similar management principles but at the nodal layer.

Messaging: Provides services to support synchronous and asynchronous information exchange among users or applications. This is a core capability of the all EESBs.

Discovery: The set of services that enable the formulation and execution of search activities to locate data assets (e.g., files, databases, services, directories, web pages, streams) and services by exploiting metadata descriptions stored in and or generated by IT repositories (e.g., directories, registries, catalogs, repositories, other shared storage).

Mediation: The set of services that enable transformation processing (translation, aggregation, integration), situational awareness support (correlation and fusion), negotiation (brokering, trading, and auctioning services) and publishing of data and metadata. This is another core capability of EESB.

Information Assurance/Security: The set of services that enables the protection, defense, integrity, and continuity of the information environment and the information it stores, processes, maintains, uses, shares, disseminates, disposes, displays, or transmits. These services provide for confidentiality, identification, authentication, authorization, and assurance for users, applications and networks. For the services layer, as opposed to the device layer, EESB is the security control point in the architecture, although the precise security definitions may be stored elsewhere, such as in an encrypted security repository.

Storage: The set of services that is necessary to provide on demand posting, storage and retrieval of data in physical or virtual data stores. An EESB can provision, and processes, data but insulates consumers from the implementation details such as physical devices, originating protocols, or data formats to name a few.

Application: The set of services that is necessary to provision, host, operate and manage the net-centric computing environment. It provides the infrastructure to host and organize distributed, online processing. Each EESB manages these implementation details for service consumers.

Collaboration: The set of services that allows users to work together and jointly use selected capabilities on the grid (i.e., chat, online meetings, work group software etc.). These are examples of the kind of collaboration services an EESB can provision.

User Assistant: Automated Help capabilities that learn and apply user preferences and patterns to assist users to efficiently and effectively utilize resources in the performance of tasks. These are other examples of services that could be provided by, but are not a core requirement to be EESBs.

A separate category of EESBs/EESB rules are utilized for each QoS realm. For example, QoS realm L3 (sub-second) includes a first category of EESBs, referred to herein as EESB_3, and has the most flexible and complex set of rules; QoS realm L2 (millisecond) includes a second category of EESBs, referred to herein as EESB_2, and has rules of lesser flexibility and complexity; and QoS realm L1 (microsecond) includes a third category of EESBs, referred to herein as EESB_1, and has very simple rules of low complexity.

Accordingly, EESB_3 nodes generally cannot be subnodes of EESB_2 or EESB_1 nodes as their behavioral rules are less stringent, i.e., their QoSs are more lax. L1 kewise EESB_2 nodes generally cannot be subnodes of EESB_1 nodes for the same reason.

Thus, for example, nodes operating in QoS realm L3 may be able to interpret many different communication protocols, which may for instance entail handling a Web Services request that requires extensive XML processing. The QoS for these types of services are relatively low and often flexible. In a warfare environment, this may for example comprise lower priority tasks such as obtaining and processing troop movement information from satellite imagery.

Nodes operating in QoS realm L2 have somewhat higher QoS requirements and are deterministic, and thus sacrifice some flexibility to achieve greater speed. For example, such nodes would likely not be able to use Web Services, but would require less flexible SOA architecture constructs. In an illustrative embodiment, products implementing the Data Distribution Standard (DDS™), from OMG, could be implemented to comply with these distributed levels of QoS. Accordingly, communications and processing by these nodes are subject to more stringent rules. In the warfare environment, illustrative nodes operating under QoS realm L2 may for example comprise devices for obtaining and processing radar data.

Finally, nodes operations in QoS realm L1 have the highest QoS requirements, and operate with the most simple and least flexible set of rules. In the warfare environment, illustrative nodes operating under QoS realm L1 may for example comprise devices for tracking inbound missiles. Technologies such as DDS™, CORBA™, and JAVA™ with Real Time Garbage Collection could be utilized for handling the millisecond and microsecond tasks on a particular node. All of these implementations have shown the capability to perform isolated tasks, and return a result, in the sub-millisecond realm.

Additional features of the EESB architecture include the ability to easily aggregate (i.e., compose) nodes of the same QoS realm in the NC 10. For instance, assume nodes N5 and N6 provide radar data. These nodes could be readily aggregated into a single unit 16 to provide more extensive radar information to a command node using L2 rule sets in an aggregated L2 node (shown within the dotted line around N5 and N6). Aggregation, in this case, could be accomplished by simple combination or the union of the constituent node data could cause the signaling of a higher order piece of data, e.g., not a simple collection of features but a holistic pattern.

Although nodes in each of the three QoS realms operate according to their own set of EESB rules (e.g., as defined by EESB_1, EESB_2, and EESB_3), an inter-bus communication pattern (IBP) 11 is utilized that allows interoperability between nodes operating in different realms. IBP 11 provides a core set of rules for operations amongst EESBs across each of the three realms. The set of rules provided by IBP 11 are referred to herein as EESB_4. These rules ensure that IBP 11 faithfully implements the specific rule set of a level when processing data from that level and follows these rules when aggregating amongst levels or among instances of a similar EESB level. Note that two important features provided by IPB 11 are the capability of individual EESBs to compose in like kind and the capability of dissimilar EESBs to compose using the IBP pattern and specific implementation through EESB_4.

Accordingly, EESB_4 provides a fourth set of rules for communicating data and sharing compute capability amongst nodes operating in different QoS realms by using an IBP 11. EESB_4 is "super-ordinate" to the first, second and third set of EESB rules, i.e., EESB_4 describes flow rules amongst the three subordinate EESBs.

Thus, using the IPB 11, an L1 (microsecond) node can access services from an L2 (millisecond) node, such as accepting a fire message, or an L3 (sub-second) node, such as orienting a weapon for later firing. Accordingly, an L1 node is able to process service requests from an L2 or L1 node, an L2 node is able to process requests from an L1 node, etc. (Moreover, in some configurations, L3 nodes could be adapted to process services from L1 and L2 nodes however only at the L3 level of QoS. This level of aggregation is desirable such as with post L1 event processing. Following similar constraints, L2 nodes could be adapted to integrate event services from L1 nodes, such as when integrating post firing event information into a common operational picture, e.g., fusing knowledge, from L1, of a firing event with a radar image of that fired entity.)

As an example, consider an operational unit 14 that has two L1 nodes N8, N9; one L2 node N7; and one L3 node N2; in which node N8 is assigned to be the master or control node. In an illustrative example, master node N8 may gather satellite (sub-second) image data from node N3 and live (millisecond) video data from node N7, and display that data to a control center N8 in which a soldier can make real time (microsecond) machine firing decisions for a remote machine gun located at node N9. As can be seen from this example, IBP 11 allows the master node N8 to access services from nodes operating at each of the three different QoS realms.

Note that operational unit 14 could itself embody the IBP 11 as well. Additionally, there may be issues involved in interposing a bus in the middle of a microsecond transactional flow. However, the machine gun node N9 may actuate in the microsecond range, but can receive orders at the millisecond QoS. A feature provided by this architecture is that the IBP can be deployed as a separate node or as a designed flow pattern amongst existing nodes. The determining factor is whether the nodes must be glued together at design time for QoS reasons (e.g., operational unit 14), or whether the IBP can be more dynamic in nature as shown by IBP 11.

As noted, the touch point to NC 10 defines the boundaries of a node. However, nodes may contain subnodes. In this way nodes can be nested, such as subsystems within systems. Subnodes communicate within a node and do not, directly share or consume information external to NC 10; however they do aggregate up via the parent node which is a special case of EESB_4. Subnodes (e.g., SN1 and SN2) may require or disseminate information, but the super-node (e.g., N10) is the broker and owns the touch point to NC 10. In cases where a subnode directly transmits to or touches NC 10, it is promoted to node status and all the nodal NC requirements are then levied on that subnode. For example, if a subnode wishes to communicate to another subnode, then these communications can be optimized for that specific need. However, if a subnode is required to make its partial information products available to the NC 10, then this information must be transmitted according to the EESB rules. For example, if the node transmits an air picture to NC 10, but another node requires an interim information product, such as correlation, then the correlation subnode, or subsystem, can be called upon to splay that information to the net using the prescribed means. The common framework for EESBs provided according to this invention thus simplifies this complex of nodes by providing a common set of operational principles.

Figure 2:
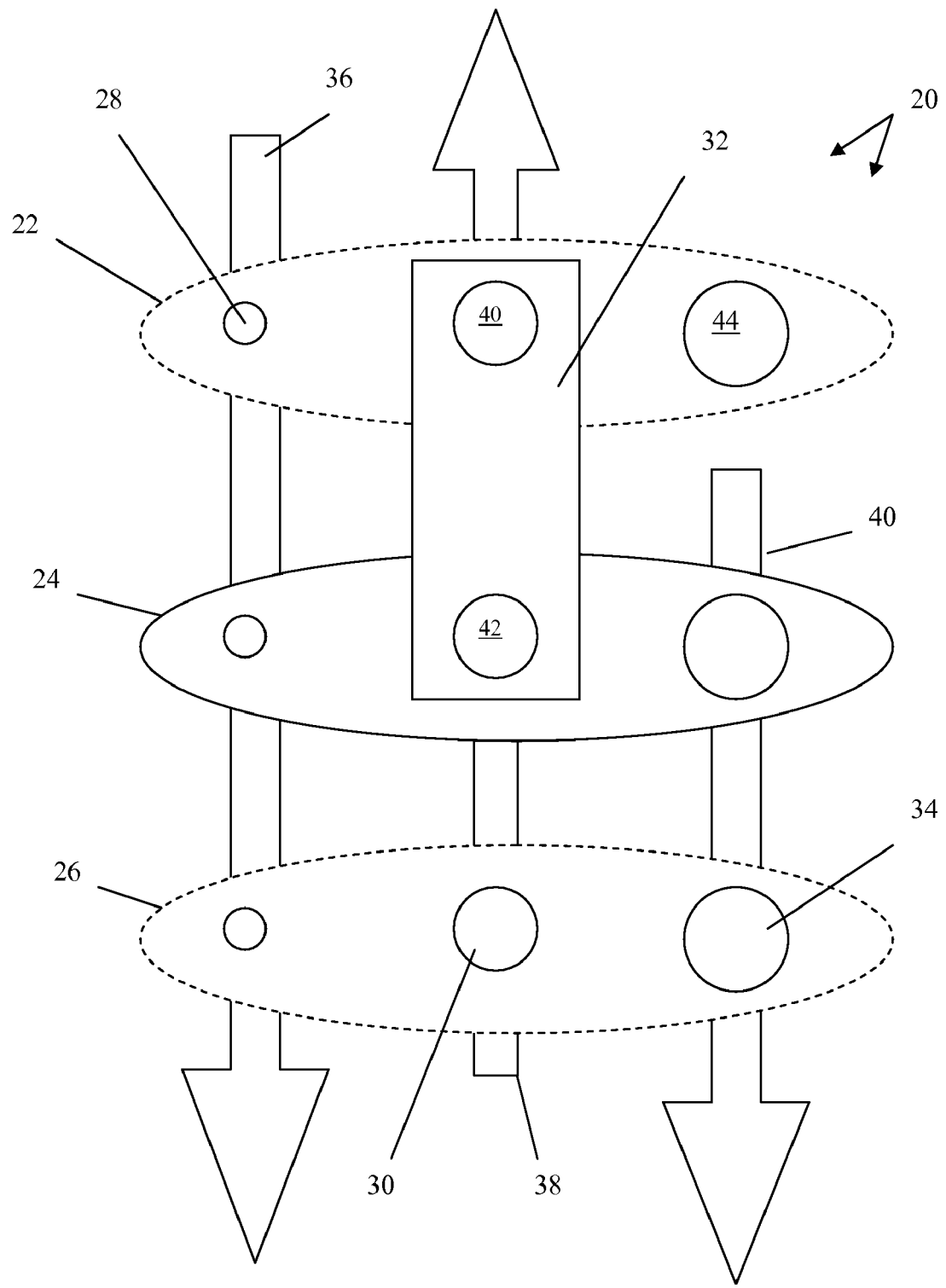
FIG. 2 depicts a platform view of a nodal complex having an EESB architecture in accordance with an embodiment of the present invention.

Referring now to FIG. 2, a platform oriented view of a NC 20 is shown, where each large oval 22, 24, 26 comprises a platform (e.g., an airplane, a tank, a subsurface platform, a car, etc.). Each platform includes nodes and/or subnodes operating within the three different QoS realms (large circles L3, medium circles, L2 and small circles L1). Because each platform has modularized EESB capabilities described above, the costs involved in performing many tasks can be greatly reduced. As can be seen by arrow 36, 38 and 40, nodes operating in similar realms can readily align to create virtualized (i.e., aggregate or composed) services, even though they do not physically reside within the same platform. Thus for instance, if sensor nodes 40 and 42 were designed with later splaying in mind, then the combination of nodes 40, 42 could be virtualized into a netted capability 32. In this case 32 is a super-node created using L2 aggregation rules. It could have been created via a L2 brokering node or by directly superimposing the L2 pattern over the nodes 40 and 42 as is shown here.

Another example of virtualization might involve the collection of planning nodes to create a common planning picture, much like the common situational awareness pictures that exist today. This could be of use to an asset coming into a warfare theatre that sees the current position of assets in the COP (Common Operational Picture), but does not know where they are moving next. The deployment of ordinates may require knowing such information.

Note that some platform capabilities, such as subnode 44, are not directly linked into the NC, and therefore must be accessed via a parent platform (i.e., node) 22. However, because of the underlying architecture, the implementation of nodes can be dynamic in nature. For example, if subnode 44 comprised a fusion engine and a new use for the fusion engine was discovered, the engine could be promoted from subnode to node status where it could be harnessed. In this sense subnodes serve a dual function; they may throw off information to the NC 20 while simultaneously executing platform-centric tasks in real time or non-real time as per their level specific rule sets.

In FIG. 2, it is shown in NC 20 that a super-node (i.e., an IBP), like an air platform 24, may have subnodes that are also splayed to the NC 20. If the oval surrounding air platform 24 is viewed, not as the physical edge of the platform, but as the super-ordinate EESB (i.e., EESB_4), then a pattern exists for linking EESBs within a node. This pattern is not perturbed by subnodal grid access, but in fact it defines it. This type of pattern provides a super-ordinate EESB. In this case, the platform is a physical implementation of an IBP. Within a platform, the super-ordinate EESB defines the kinds of communications that will occur amongst subnodes. It may prescribe that the L3 EESB aggregates information from sources external to the platform and from both the L1 and L2 EESBs. For example, it may take in ISR (Intelligence Surveillance, and Reconnaissance) information from the NC 20, also collect radar information from the millisecond EESB, and receive periodic firing reports from the microsecond EESB.

All of this information could be aggregated into one common characterization of the immediate battle space conditions.

The EESB architecture also supports fractalization. Fractalization of EESBs allows each super-ordinate EESB to organize the information services of its subordinate EESBs or aggregate up super-ordinate EESBs such as NC 20, which is a super-node organized by a common set of aggregation principles. Thus for instance, when interference causes network problems, the network could degrade gracefully. For instance, if a tree of nodes and EESBs were disconnected from the NC 20, they could still operate as a collection because the communications architecture would preserve whatever connections were related and still operational. Graceful degradation is another feature of this architecture. Only by prescribing this set of inter-EESB rules can composition and degradation occur gracefully, e.g., preserving whatever capability remains as a unit. Because of the flexibility of the NC architecture, EESBs lend themselves to a variety of organizing principles. EESBs could be established by a community of interest, span of a conflict, geography, or any number of other organizing principles. These netted EESBs can serve as touch points for the platform or nodal EESBs. Similarly, netted EESBs could then aggregate nodal information to achieve new levels of virtualization.

Note that access to grid 10 (FIG. 1) may be provided over any type of network such as the Internet, a local area network (LAN), a wide area network (WAN), a virtual private network (VPN), etc. Communication could occur via a direct hard-wired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, communication could occur in a client-server or server-server environment. The communication choice is left to the implementer and not a constraining factor in this invention. The EESB operational rules, however, should guide the choice of communications medium.

It should be appreciated that the teachings of the present invention could be offered as a business method on a subscription or fee basis. For example, a NC 10 comprising various service nodes operating at different QoS realms could be created, maintained and/or deployed by a service provider that offers the functions described herein for customers. That is, a service provider could offer to provide access to a grid such as that described above.

Note also that while many of the teachings provided above relate to warfare environments, the architecture described herein is not limited to any particular field. For instance, it could be used in business, transportation, engineering and science, research and development, etc. One example could be in the automotive industry in which a car has at least three realms. A level 1 example of functionality would be air bag (actuation) deployment. Once deployed, the air bag mechanism may trip an indicator light (similar to a report out coming out of a weapon deploying) in an L2 type timeframe. L3 operations would be responsible for slower maintenance oriented systems, and corresponding indicators, with which every user is familiar. The design of these as adherent to one NC architecture and the corresponding interoperable functioning is an example where current designs could benefit from the overlay of this invention.

It is also understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for implementing a nodal complex (NC) having an architecture that supports multiple quality of service (QoS) realms, comprising:
  providing a first set of extended enterprise service bus (EESB) rules for supporting nodes operating in a sub-second QoS realm using a computer;
  providing a second set of EESB rules for supporting nodes operating in a millisecond QoS realm using a computer;
  providing a third set of EESB rules for supporting nodes operating in a microsecond QoS realm using a computer;
  wherein the first, second and third sets of EESB rules each define a set of acceptable communication protocols for an associated QoS realm;
  communicating data and sharing compute capability amongst nodes operating in different QoS realms by using an inter-bus communication pattern that is super-ordinate to the first, second and third sets of EESB rules; and
  aggregating nodes in a same QoS realm to provide an aggregated service over the nodal complex.

2. The method of claim 1, comprising the step of making a node nodal complex-ready by incorporating an EESB into the node.

3. The method of claim 1, comprising the further step of defining a subnode for a node that communicates with the node in accordance with one of the first, second and third set of EESB rules.

4. The method of claim 1, comprising the step of having a first node operating in a first QoS realm access services from a second node operating in a second QoS realm.

5. The method of claim 1, wherein the nodal complex comprises a military warfare network that includes a plurality of platforms, wherein each platform includes nodes operating in different QoS realms.

6. The method of claim 1, wherein:
- the EESB rules for supporting nodes operating in a microsecond QoS realm are stricter and provide a higher QoS relative to the EESB rules for supporting nodes operating in a millisecond QoS realm; and
- the EESB rules for supporting nodes operating in a sub-second QoS realm are more flexible and provide a lower QoS relative to the EESB rules for supporting nodes operating in a millisecond QoS realm.

7. A non-transitory computer readable medium storing a computer program executed by a processor to participate in a nodal complex that has an architecture that supports multiple quality of service (QoS) realms, wherein the computer program comprises the following:
- program code configured for providing an extended enterprise service bus (EESB) defined from a rule set selected from the group consisting of: a first set of EESB rules for supporting nodes operating in a sub-second QoS realm, a second set of EESB rules for supporting nodes operating in a millisecond QoS realm, and a third set of EESB rules for supporting nodes operating in a microsecond QoS realm; wherein the first, second and third sets of EESB rules each define a set of acceptable communication protocols for an associated QoS realm; and
- program code configured for providing a fourth set of rules for communicating data and sharing compute capability amongst nodes operating in different QoS realms by using an inter-bus communication pattern that is super-ordinate to the first, second and third sets of EESB rules;
- wherein the EESB includes program code configured for aggregating with other nodes in a same QoS realm to provide an aggregated service over the nodal complex.

8. The computer readable medium of claim 7, wherein the EESB includes program code configured for communicating with a subnode in accordance with the selected rule set.

9. A method for implementing a nodal complex having an architecture that supports multiple quality of service (QoS) realms, comprising:
- associate an extended enterprise service bus (EESB) to the node, wherein the EESB is defined from a rule set selected from the group comprising: a first set of EESB rules for supporting nodes operating in a sub-second QoS realm using a computer, a second set of EESB rules for supporting nodes operating in a millisecond QoS realm using a computer, and a third set of EESB rules for supporting nodes operating in a microsecond QoS realm using a computer; wherein the first, second and third sets of EESB rules each define a set of acceptable communication protocols for an associated QoS realm; and wherein the EESB allows the node to communicate data and share compute capability with other nodes in the network operating in different QoS realms by using a fourth set of EESB rules that provides an inter-bus communication pattern that is super-ordinate to the first, second and third sets of EESB rules;
- wherein a plurality of nodes in a same QoS realm are aggregated to provide an aggregated service over the nodal complex.

* * * * *